E. T. WINKLER.
AUTOMATIC REGULATION OF THE EVAPORATING PRESSURE IN REFRIGERATING SYSTEMS.
APPLICATION FILED FEB. 21, 1910.
985,563.
Patented Feb. 28, 1911.
3 SHEETS—SHEET 1.
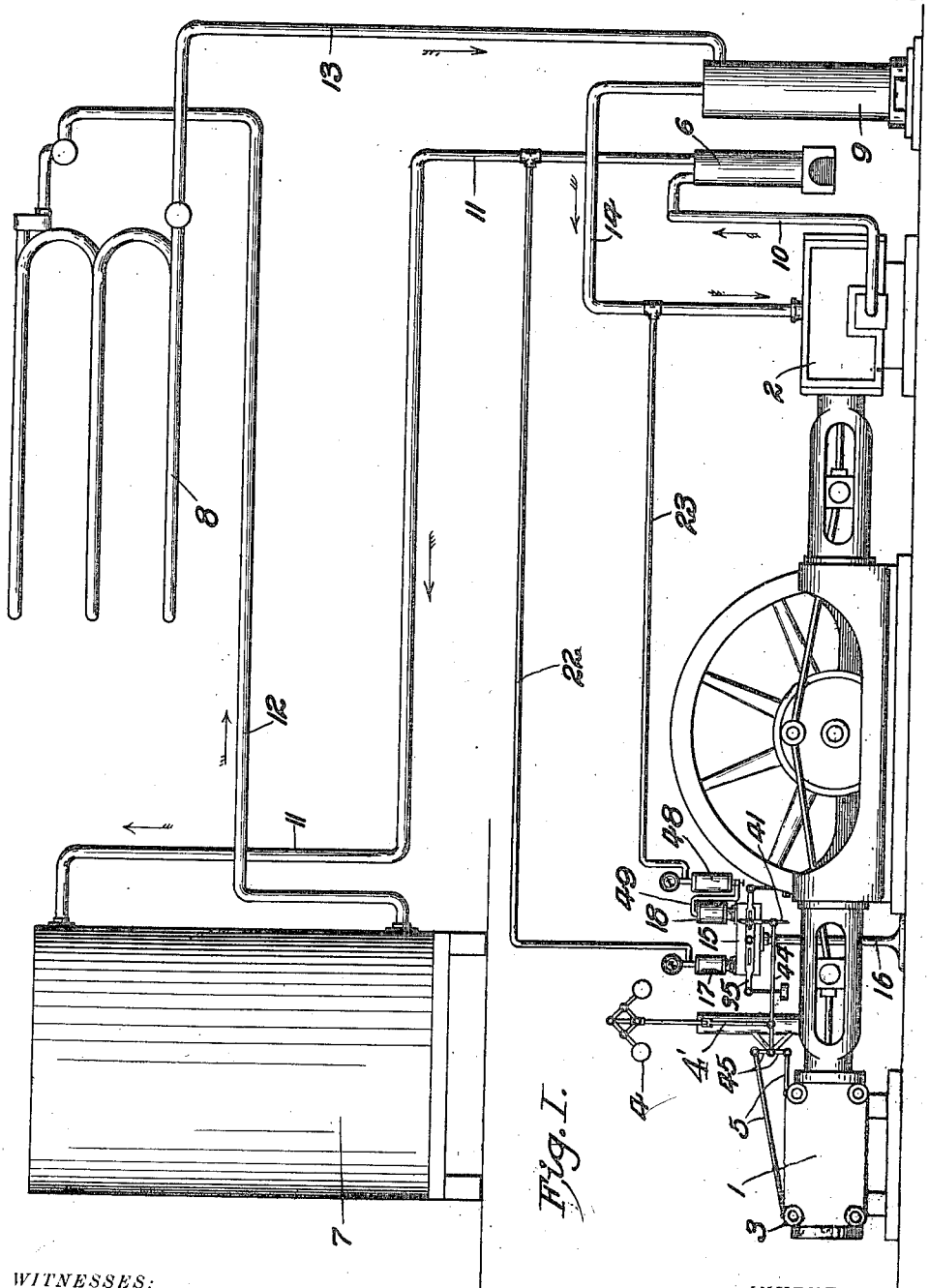
Fig. I.
WITNESSES:
INVENTOR.
E. T. Winkler.
BY
ATTORNEY.

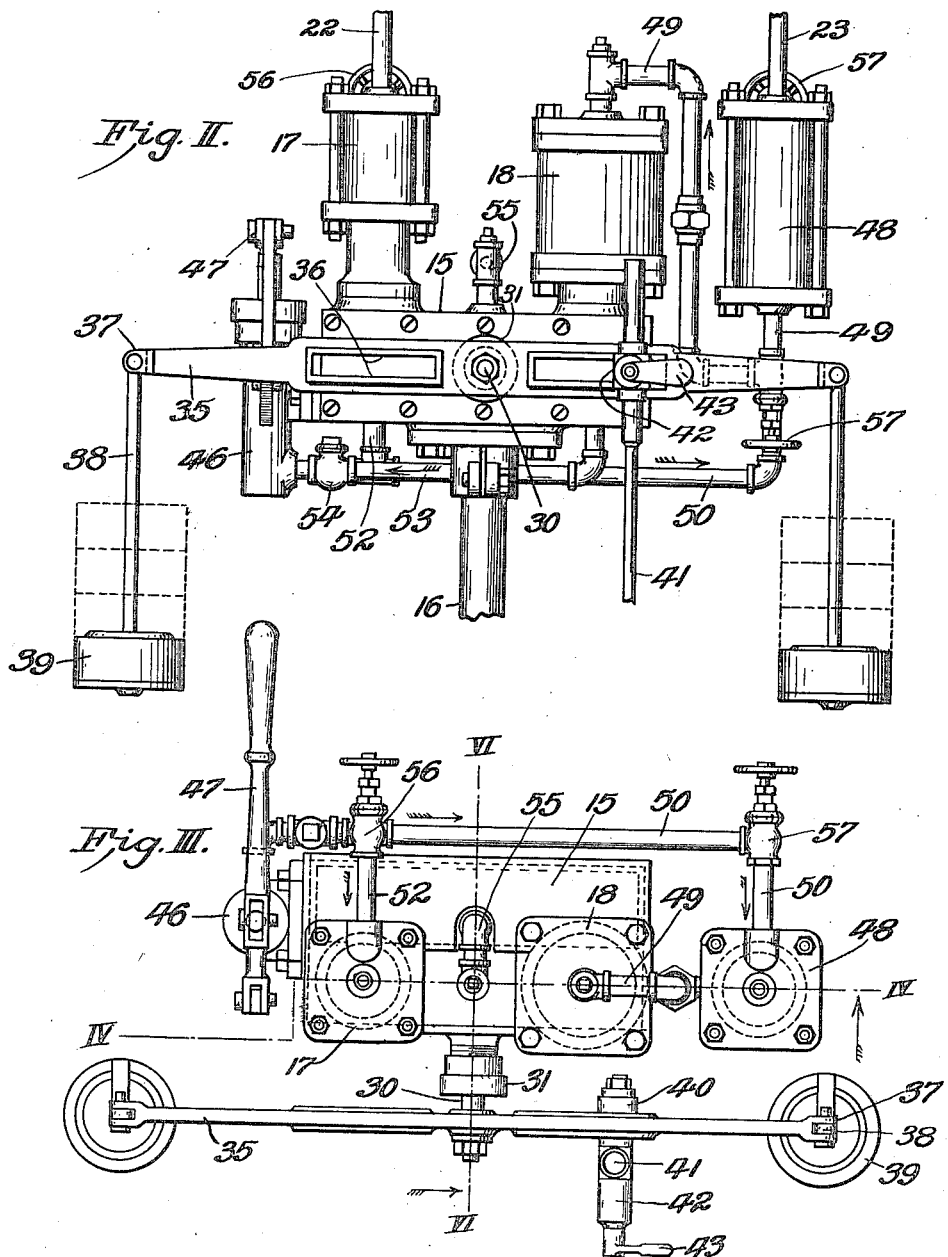

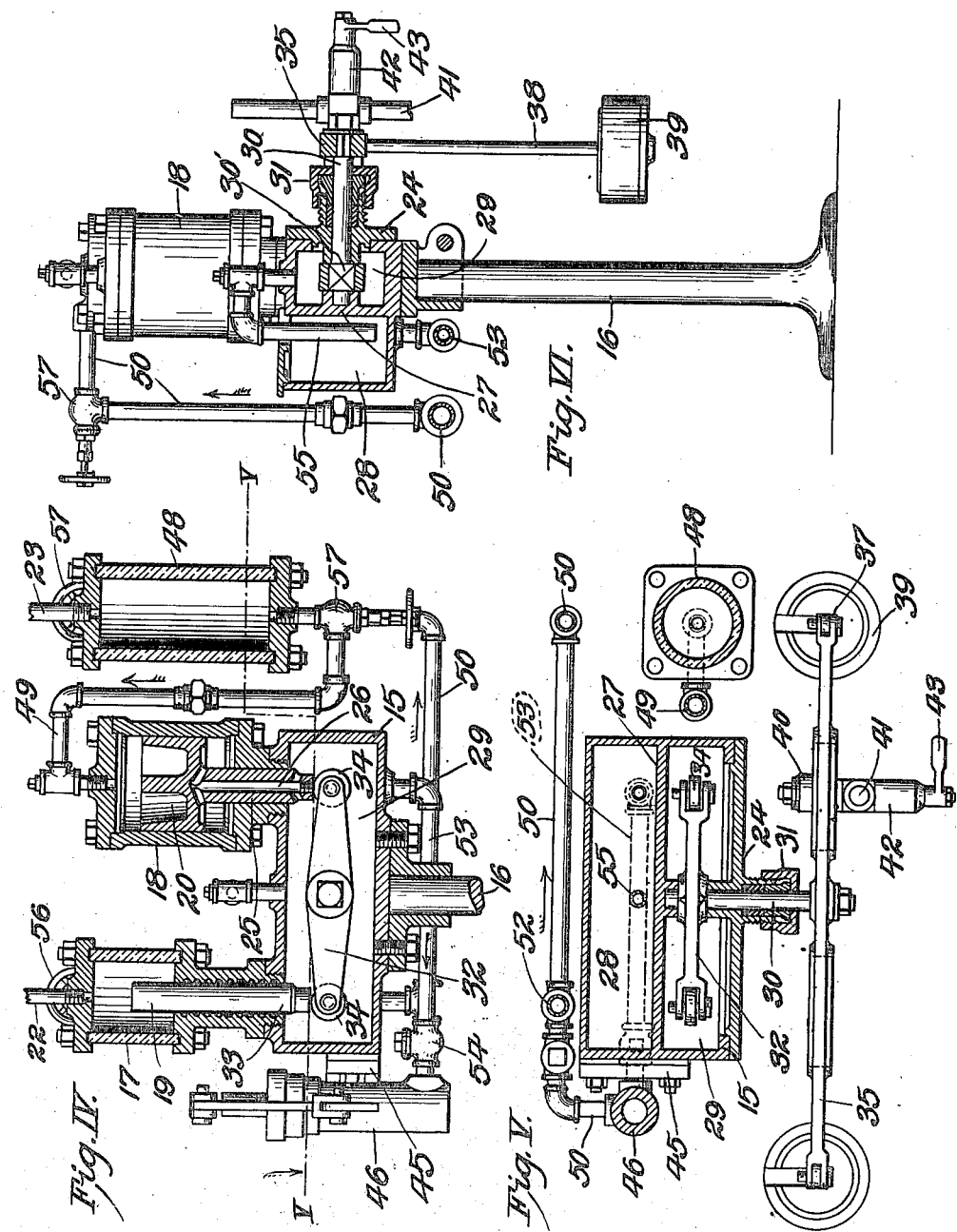

UNITED STATES PATENT OFFICE.

EHREGOTT T. WINKLER, OF KANSAS CITY, MISSOURI.

AUTOMATIC REGULATION OF THE EVAPORATING PRESSURE IN REFRIGERATING SYSTEMS.

985,563.      Specification of Letters Patent.      Patented Feb. 28, 1911.

Application filed February 21, 1910. Serial No. 544,970.

*To all whom it may concern:*

Be it known that I, EHREGOTT T. WINKLER, a citizen of the United States, residing at Kansas City, in the county of Jackson and State of Missouri, have invented certain new and useful Improvements in Automatic Regulation of the Evaporating Pressure in Refrigerating Systems; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to means for automatically regulating the evaporating pressure of the refrigerating fluid in systems employing a liquefiable gas as the circulating medium.

This apparatus is constructed for the purpose of maintaining a constant evaporating pressure and temperature of the liquid to be evaporated, and to regulate the speed of the compressor according to the varying amounts of liquefied gases evaporated in the coils of the various cooling compartments.

The amount of evaporation regulates the speed of the compressor and also the amount of fuel necessary to perform the required work at any time.

Experience and the nature of liquefied gases have taught that in order to produce the different constant temperatures in numerous cooling compartments or ice freezing tanks it is necessary to maintain a constant evaporating pressure in all compartments, so that the change of the quantity of supply of liquid to any compartment will not affect the supply of liquid in adjoining compartments of the system, and consequently the liquefied gases will enter all the time under the same temperature in required quantities into the coils of the cooling compartments. This desirable point is reached with the least variation by the use of said automatic pressure and temperature regulator.

With the present system in use, the speed of the compressor is constant and the temperature and the evaporating pressure of the liquefied gas are varying, resulting in the inability to keep the different cooling compartments and ice freezing tanks at the various desired constant temperatures, besides it requires more time, power and manual labor than is properly proportional to the amount of work performed. Even the adoption of thermostatic valves as well as manual labor to regulate the supply of liquefied gas to the coils of the cooling compartments in order to keep and produce the desired temperature is impracticable, as each regulation at either compartment changes the evaporating pressure, the temperature and the amount of liquid entering the coils of all compartments, and the labor, time and fuel used in trying to produce the desired temperature are in vain. Also, in the present operation of refrigerating machines with varying loads, the proper evaporating pressure (if reached at all) cannot be maintained with the use of manual labor, without a variation in evaporating pressure of about 20 lbs., and consequently a variation in temperature of 26 degrees. Therefore the machines are unable to maintain the desired constant temperatures.

With the adoption of this automatic regulator the variation in evaporating pressure will be about 1 lb., and the consequent variation in temperature $1\frac{1}{2}$ degrees. The least increase or decrease in the amount of work will produce the corresponding speed of the compressor at any time such changes occur, and therefore the power consumed is exactly in proper proportion to the amount of work performed, excluding waste of fuel and manual labor.

Briefly stated, my invention consists in the combination, with a compressor and an endless conduit for the refrigerating fluid, of means actuated by the changes in relative pressures in the conduit, at the intake and discharge sides of the compressor, for varying the speed of the compressor.

It will be understood that changes in the vaporization in the system will be accompanied by changes in the relative pressures at or adjacent to the intake and the discharge of the compressor. By means of suitable mechanism I cause the varying pressures to act in opposition upon a lever, whose movements are transmitted to a governing device adapted to govern the speed of the compressor.

The object of my invention is attained by the construction to be described, and illustrated in the accompanying drawings, in which:—

Figure I is a diagrammatic general view, showing a steam driven compressor, a conduit for the fluid, and my regulating device applied to an ordinary governor on the steam end of the compressor. Fig. II is an elevation of the regulating mechanism, its supporting stand broken away. Fig. III is a top plan view of the same. Fig. IV is a vertical section taken on line IV—IV of Fig. III. Fig. V is a horizontal section taken on line V—V of Fig. IV. Fig. VI is a central vertical section taken on line VI—VI of Fig. III.

Referring more in detail to the parts:—

In Fig. I, 1 designates the steam-cylinder and 2 the compressing cylinder, of a steam power compressor. The valves 3 of cylinder 1 are provided with a flyball governor 4, which has connection with said valves through a rod 4', a lever 44—45, and rods 5. I have shown only such parts as are necessary toward a perfect understanding of my invention. 6 designates the compressor receiver, 7, a condenser, and 8, one of the vaporizing or heat-absorbing coils. 9 designates a receiving chamber for the vapor. A pipe 10 connects the discharge side of the compressor to said receiver 6, and a pipe 11 connects said receiver to the condenser 7. From the condenser, a pipe 12 leads to the coil 8, from which a pipe 13 leads to receiver 9. A pipe 14 connects the last named receiver to the intake of the compressor. The above mentioned parts constitute the closed, or endless, conduit referred to in the appended claims.

For simplicity of showing, I have omitted certain devices that are usually employed in systems of this kind, such as manifolds, distributing valves, and a tank in the line between the condenser and the vaporizing coil.

The regulating mechanism has a casing 15, supported by a stand 16 as shown, or in any other suitable manner. Said mechanism comprises two piston cylinders 17 and 18, in which are pistons 19 and 20 of unequal diameters. The exposed areas of these pistons are proportioned to the ratio between the usual pressures in the fluid conduit at or near the intake and the discharge of the compressor, 2. In other words, the areas are inversely proportional to the pressures in the respective cylinders. The high pressure cylinder, 17, is connected by a pipe 22 to the pipe 11, leading from the receiver 6, instead of to the pipe 10, for the obvious purpose of avoiding the pulsations due to the strokes of the compressor piston. The low-pressure cylinder, 18, is connected by a pipe 23 to the pipe 14 which returns the vapor to the compressor.

The lower ends of the cylinders are formed with piston rod guides, through which the piston rods extend downwardly into a chamber 29, adapted to hold oil or other liquid. The rod 25 of the large piston is provided with a passage 26 which maintains communication between the cylinder below said piston and the chamber 29. The pistons are provided with packing, as shown.

The casing 15 is provided with a vertical partition 27 that forms two separate chambers 28 and 29. Said partition and one wall of chamber 29 are provided with bearings for a horizontally disposed rock-shaft 30. Wall 24 is provided with a stuffing-box 31 through which said shaft extends. Between its bearings, said shaft is squared, and on said squared part, 30', a balancing lever 32 is mounted, its arms extending in opposite directions and in alinement with the piston rods 25, 33. Beneath said rods respectively, rollers 34 are mounted on said lever, and receive the pressures from said rods.

Fixed upon the outer end of rock-shaft 30 is a horizontally disposed lever 35, extending each way from said shaft. Its arms are provided with longitudinal slots 36, and at their ends with pivot jaws 37, from which are suspended rods 38, adapted to carry weights, as 39. Fixed in one of said slots 36 is a rod head 40, having a vertical bore for the reception of a rod 41, and provided with a clamping device 42 operable by turning a handle 43, whereby the rod 41 may be held engaged with, or disengaged from, said head and lever 35. The said clamping device may be pivotally mounted.

Rod 41 is connected pivotally to an arm 44 of a bell-crank lever 44—45, having an arm or arms 45 connected to the governor-rods 5 of the flyball governor 4. With Corliss valves, the rod or rods 5 vary the cutoff; but my invention may be applied to "throttling" governors as well as the Corliss type, or to regulate the speed of electric or hydraulic motors.

The cylinders 17 and 18 are to be filled with oil, glycerin, or other siutable liquid that will not absorb the refrigerating fluid. Said oil, or similar liquid, provides a perfect seal which prevents any escape of the refrigerant around the pistons 19, 20.

Mounted on a bracket 45' is an oil pump 46, operable by a lever 47, for pumping excess of oil from chamber 29 back into cylinders 17 and 18; chamber 29 being gradually filled by leakage around the piston rods 25, 33. Adjacent to the low-pressure cylinder is a combined reservoir and gage 48, the bottom of which is connected to the top of cylinder 18 by a pipe 49. From the upper part of gage 48, a pipe 50 extends to the pump 46. Preferably, the sides of cylinder 17 and gage 48 are made of glass, so that the quantity of oil therein may be observed. From pipe 50, a branch 52 is connected to the upper part of cylinder 17. The oil pumped into gage 48 passes thence into the piston cylinder 18.

To the inlet of the pump 46, is connected a pipe 53 which is connected to the bottom of chamber 28. In this pipe is a check valve 54. A siphon shaped pipe 55 depends into said chamber 28 and one end thereof is connected to the top of chamber 29.

By the above described connections, an attendant may pump oil into cylinders 17 and 48 whenever the liquid runs low therein. The arrows indicate the directions of flow of the liquid during the pumping. When chamber 29 becomes filled with oil, further leakage will cause an overflow through pipe 55 into chamber 28. Except when the pump is being operated, the cylinder 17 and gage 48 must be cut off from the pump, and for this purpose hand-valves 56 and 57 are provided.

The operation of the regulating apparatus is as follows:—When the vaporization increases in any of the coils 8 of the system, the vapor pressure in pipes 13, 14, 23 and low-pressure cylinder 18 will increase. This will depress piston 20 and the engaged end of lever 32, which will rock shaft 30 and correspondingly tilt lever 35, which will depress rod 41 and arm 44 of bell-crank lever 44—45. This will shift the aforesaid governor rods 5 in such a way as to lengthen the cutoff and thereby raise the speed of the compressor by a degree sufficient to properly increase the fluid pressure in the vaporizing coils 8. When the vaporization decreases, all of the above named parts will be actuated in the opposite direction, and the fluid pressure will be decreased. Thus the regulation of the vaporization pressure and temperature will be entirely automatic, and the advantages hereinbefore set forth will accrue.

The apparatus will be operative without weights 39 upon the lever rods 38. However, should it be desired to change the evaporating pressure of the liquid, a weight is placed on one of the rods 38, being placed on the right-hand rod to raise the pressure, or on the opposite rod to lower the pressure. The effect will be to shift the lever 35, as the parts are so constructed and lubricated as to move very easily.

It is desirable to have the flyballs 4 retain their usual connection with the rods 5. The revolving flyballs will ease the movements of the parts, which movements would otherwise be jerky.

In systems where compressors driven by gas, electric or hydraulic power are employed, my herein described regulator may be operatively connected with the governor of the gas engine, electric or hydraulic motor.

Having thus described my invention, what I claim as new therein and desire to secure by Letters-Patent is:—

1. In an automatic regulator, two cylinders, a piston on each cylinder, said pistons having unequal diameters, a balancing lever engaged by said pistons, a chamber for receiving leakage around the pistons, a pump, a connection between the pump and said chamber, a connection between the pump and cylinders, and valves for opening or closing said connections.

2. In an automatic regulator, two cylinders mounted upon a liquid chamber, a piston in each cylinder, said pistons extending into said chamber, a balancing lever in said chamber, engaged by the pistons, said pistons having unequal diameters, the larger piston having a rod provided with a passage connecting the cylinder below the piston with said chamber below the cylinders.

3. In an automatic regulator, two cylinders mounted upon a liquid chamber, a piston in each cylinder and extending into said chamber, a horizontal rock-shaft projecting into said chamber between the axial lines of the pistons, a lever mounted on said shaft and having rollers engaged by the respective pistons, and a packing around said shaft.

4. In an automatic regulator, two cylinders mounted upon a liquid chamber, a piston in each cylinder and extending into said chamber, a horizontal rock-shaft projecting into said chamber between the axial lines of the pistons, a lever mounted on said shaft and having rollers engaged by the respective pistons, a packing around said shaft, a lever fixed upon said shaft exteriorly of the chamber, said exterior lever having a longitudinal slot, and a rod clamping head mounted in said slot.

5. In an automatic regulator, two cylinders mounted upon a liquid chamber, a piston in each cylinder and extending into said chamber, a horizontal rock-shaft projecting into said chamber between the axial lines of the pistons, a lever mounted on said shaft and having rollers engaged by the respective pistons, a packing around said shaft, a lever fixed upon said shaft exteriorly of the chamber, said exterior lever having a longitudinal slot, a rod-clamping head mounted in said slot, a rocking lever, a governor-rod connected to said lever, and a rod connecting said lever with said clamping head.

6. In a refrigerating system, a steam driven compressor having a governor comprising a rocking lever and a governor rod connected therewith, a closed conduit for the refrigerating fluid, a high pressure cylinder connected to said conduit adjacent the discharge of the compressor, a low pressure cylinder connected to said conduit adjacent the intake of the compressor, a piston in each cylinder, a balancing lever engaged and actuated by said pistons, and an operative connection between the balancing lever and said rocking lever.

7. In an automatic regulator, a pair of cylinders mounted side by side, a piston in each cylinder, a balancing lever engaged by said pistons, a second lever actuated by said balancing lever, and provided with means for holding detachable weights upon either arm thereof.

8. In an automatic regulator, a liquid chamber, a cylinder mounted thereon, a piston on the cylinder, a piston-rod bore connecting the cylinder and chamber, and a piston rod passing through said bore into the chamber, said rod being provided with a passage connecting the space below the piston with the interior of the chamber.

In testimony whereof I affix my signature in presence of two witnesses.

EHREGOTT T. WINKLER.

Witnesses:
MYRTLE M. JACKSON,
K. M. IMBODEN.